(12) United States Patent
Kumar et al.

(10) Patent No.: US 11,143,835 B2
(45) Date of Patent: Oct. 12, 2021

(54) OPTICAL FIBER RIBBON DUCT CABLE

(71) Applicant: Sterlite Technologies Limited, Aurangabad (IN)

(72) Inventors: Sravan Kumar, Aurangabad (IN); Kishore Sahoo, Aurangabad (IN); Venkatesh Murthy, Aurangabad (IN); Atul Mishra, Aurangabad (IN); Pavan Moturu, Aurangabad (IN); Gahininath Shinde, Aurangabad (IN); Mahesh Deshpande, Aurangabad (IN); Kangabam Tenzing, Aurangabad (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 16/108,098

(22) Filed: Aug. 22, 2018

(65) Prior Publication Data
US 2019/0064469 A1    Feb. 28, 2019

(51) Int. Cl.
*G02B 6/44*    (2006.01)

(52) U.S. Cl.
CPC ......... *G02B 6/4494* (2013.01); *G02B 6/4404* (2013.01); *G02B 6/4433* (2013.01); *G02B 6/4498* (2013.01)

(58) Field of Classification Search
CPC .. G02B 6/4494; G02B 6/4433; G02B 6/4404; G02B 6/4498

USPC .................................................. 385/109–114
See application file for complete search history.

(56) References Cited

U.S. PATENT DOCUMENTS

| | | | | |
|---|---|---|---|---|
| 5,050,957 | A * | 9/1991 | Hamilton ............... | G02B 6/443 385/113 |
| 6,813,421 | B2 * | 11/2004 | Lail ....................... | G02B 6/4411 385/101 |
| 2004/0091221 | A1 * | 5/2004 | Debban, Jr. .......... | G02B 6/4411 385/114 |
| 2013/0084047 | A1 * | 4/2013 | Baucom ................. | G02B 6/44 385/114 |

* cited by examiner

*Primary Examiner* — Kaveh C Kianni
*Assistant Examiner* — Hung Q Lam

(57) ABSTRACT

The present disclosure provides an optical fiber cable. The optical fiber cable includes a plurality of optical fibers lying substantially along a longitudinal axis of the optical fiber cable. Further, the optical fiber cable includes a first layer surrounding the plurality of optical fibers. Furthermore, the optical fiber cable includes a second layer surrounding the first layer. Furthermore, the optical fiber cable includes a third layer surrounding the second layer. Moreover, the optical fiber cable includes a fourth layer surrounding the third layer. The first layer is a water blocking tape. The second layer is a buffer tube layer made of polyethylene material and foamed with master batch. The third layer is a water blocking tape. The fourth layer is a sheath made of polyethylene material. Moreover, the fourth layer has a plurality of strength members embedded inside the fourth layer.

14 Claims, 2 Drawing Sheets

OPTICAL FIBER RIBBON DUCT CABLE

TECHNICAL FIELD

The present disclosure relates to the field of optical fiber cables. More particularly, the present disclosure relates to the optical fiber ribbon duct cables for indoor, outdoor and underground applications. The present application is based on, and claims priority from an Indian Application Number 201721029779, filed on 23 Aug. 2017 the disclosure of which is hereby incorporated by reference herein.

BACKGROUND

Optical fiber cables have secured an important position in building network of modern communication systems across the world. One such type of optical fiber cables are optical fiber ribbon cables. These optical fiber ribbon cables are installed in ducts. These optical fiber ribbon cables include a plurality of optical fibers ribbons. Each optical fiber ribbon includes a number of optical fibers placed adjacent and bonded together with a matrix material. These optical fiber ribbons may be held inside a central buffer tube which may be covered by additional layers such as water blocking layers, armoring layer, sheathing layer and the like. Typically, these optical fiber ribbon cables include strength members embedded in a jacket of the cable. In addition, these optical fiber ribbon cables can be prepped and spliced rapidly through mass fusion splicing. This leads to easy installation, less installation time. Optical fiber cables have secured an important position in building network of modern communication systems across the world. One such type of optical fiber cables are optical fiber ribbon cables. These optical fiber ribbon cables are installed in ducts. These optical fiber ribbon cables include a plurality of optical fibers ribbons. Each optical fiber ribbon includes a number of optical fibers placed adjacent and bonded together with a matrix material. These optical fiber ribbons may be held inside a central buffer tube which may be covered by additional layers such as water blocking layers, armoring layer, sheathing layer and the like. Typically, these optical fiber ribbon cables include strength members embedded in a jacket of the cable. In addition, these optical fiber ribbon cables can be prepped and spliced rapidly through mass fusion splicing. This leads to easy installation, less installation time, low installation cost and the like. Traditionally, these optical fiber ribbon cables do not have any gel present inside the core which reduces preparation time. Further, these optical fiber ribbon cables undergo a water penetration test. In general, the water penetration test is a test used to determine the ability of a cable to block water ingression along a specified length.

The currently available optical fiber ribbon cables have several drawbacks. Conventionally, the prior art optical fiber ribbon cables with ribbon dry buffer tubes are big in size due to which the cables face a challenge to meet the water penetration test with marine water. In addition, these optical fiber cables lack in flexibility and have high bend radius due to the presence of embedded strength members diagonally inside the jacket. These strength members induce preferential bending in the cable. In preferential bending, the optical fiber cable having diagonally opposite strength members bend readily in the plane that passes through the strength members but do not bend readily in an orthogonal plane. Such preferential bending is undesirable for cable blowing operations.

In light of the foregoing discussion, there exists a need for an optical fiber cable which overcomes the above cited drawbacks of conventionally known optical fiber cables.

SUMMARY

In a first example, an optical fiber cable is provided. The optical fiber cable may be defined by an arrangement of a plurality of strength members. The optical fiber cable may include a plurality of optical fibers lying substantially along a longitudinal axis of the optical fiber cable. Further, the optical fiber cable may include a plurality of layers surrounding the plurality of optical fibers. Furthermore, the optical fiber cable may include the plurality of strength members embedded in exactly one layer of the plurality of layers of the optical fiber cable. Moreover, each layer of the plurality of layers is concentric to each other. The plurality of embedded strength members may include two pairs of strength members positioned diagonally opposite to each other. In addition, each pair of the strength members may include a first strength member and a second strength member. Further, a first diameter of the first strength member is in a range of about 1.4 millimeters to 1.6 millimeters. Furthermore, a second diameter of the second strength member is in a range of about 1.6 millimeters to 1.8 millimeters. Moreover, distance in between the first strength member and the second strength member in each pair of strength members is in a range of about 0.1 millimeter to 0.4 millimeter.

In a second example, an optical fiber cable is provided. The optical fiber cable may be defined by an arrangement of a plurality of strength members. The optical fiber cable may include a plurality of optical fibers lying substantially along a longitudinal axis of the optical fiber cable. Further, the optical fiber cable may include a plurality of layers surrounding the plurality of optical fibers. Furthermore, the optical fiber cable may include the plurality of strength members embedded in exactly one layer of the plurality of layers of the optical fiber cable. Each layer of the plurality of layers is concentric to each other. The plurality of strength members may include two pairs of strength members positioned diagonally opposite to each other. The two pairs of strength members are 180 degree apart. In addition, each pair of the strength members may include a first strength member and a second strength member. Further, a first diameter of the first strength member is in a range of about 1.4 millimeters to 1.6 millimeters. Furthermore, a second diameter of the second strength member is in a range of about 1.6 millimeters to 1.8 millimeters. Moreover, distance between the first strength member and the second strength member in each pair of strength members is in a range of about 0.1 millimeter to 0.4 millimeter. Also, each of the plurality of strength members may be coated with ethylene acrylic acid.

In a third example, an optical fiber cable is provided. The optical fiber cable may be defined by an arrangement of a plurality of strength members. The optical fiber cable may include a plurality of optical fibers lying substantially along a longitudinal axis of the optical fiber cable. Further, the optical fiber cable may include a plurality of layers surrounding the plurality of optical fibers. Furthermore, the optical fiber cable may include the plurality of strength members embedded in exactly one layer of the plurality of layers of the optical fiber cable. In addition, each layer of the plurality of layers is concentric to each other. Moreover, the plurality of layers may include a first layer, a second layer, a third layer and a fourth layer. The first layer surrounds the plurality of optical fibers. The first layer is a water blocking tape and the first layer has a thickness in a range of about 0.10 millimeter to 0.20 millimeter. The second layer is a buffer tube layer surrounding the first layer and the plurality of optical fibers. The second layer has a filling co-efficient of greater than 0.3. The second layer is made of polyethylene material and a foaming master batch. In addition, the foaming master batch is processed at a temperature of at least 220 degree centigrade. Further, the second layer has a thickness in a range of about 0.6 millimeter to 0.8 millimeter. Furthermore, the second layer has a diameter in a range of about 7.6 millimeters to 8.0 millimeters for the optical fiber cable enclosing 144 fibers. Moreover, the second is having a weight in a range of about 8.4 to 20.43 kg when the second layer is made by using foaming agent master batch with the polyethylene material. The filling co-efficient is the ratio of area of the plurality of fibers to a first area of the buffer tube. The foaming master batch is a chemical foaming agent used to reduce weight of the second layer. The third layer surrounds the second layer. The third layer is a water blocking tape. In addition, the third layer has a thickness in a range of about 0.2 millimeter to 0.3 millimeter. Further, the fourth layer surrounds the third layer. The fourth layer may be made of polyethylene material and the fourth layer has a thickness in a range of about 2.5 millimeters to 3.5 millimeters. The fourth layer has a diameter in a range of about 14 millimeters to 16 millimeters for the optical fiber cable enclosing 144 fibers. The plurality of strength members may include two pairs of strength members positioned diagonally opposite to each other. In addition, each pair of strength members comprises a first strength member and a second strength member. Further, a first diameter of the first strength member is in a range of about 1.4 millimeters to 1.6 millimeters and a second diameter of the second strength member is in a range of about 1.6 millimeters to 1.8 millimeters. Also, the distance in between the first strength member and the second strength member in each pair of the strength members is in a range of about 0.1 millimeter to 0.4 millimeter. Moreover, each of the plurality of strength members may be coated with ethylene acrylic acid.

1. In an embodiment of the present disclosure, the plurality of layers may include a first layer. In addition, the first layer surrounds the plurality of optical fibers. Further, the first layer is water blocking tape. Furthermore, the first layer has a thickness in a range of about 0.10 millimeter to 0.20 millimeter.
2. In an embodiment of the present disclosure, the plurality of layers may include a second layer. The second layer is a buffer tube layer surrounding the first layer and the plurality of optical fibers. In addition, the second layer has a filling co-efficient of greater than 0.3. Further, the filling co-efficient is the ratio of area of the plurality of optical fibers to a first area of the buffer tube.
3. In an embodiment of the present disclosure, the plurality of layers may include a third layer. In addition, the third layer surrounds the second layer. Further, the third layer is a water blocking tape. Furthermore, the third layer is water blocking tape. Moreover, the third layer has a thickness in a range of about 0.2 millimeter to 0.3 millimeter.
4. In an embodiment of the present disclosure, the plurality of layers may include a fourth layer. The fourth layer surrounds the third layer. In addition, the fourth layer is made of polyethylene material. Further, the fourth layer has a thickness in a range of about 2.5 millimeters to 3.5 millimeters. Furthermore, the fourth layer has a diameter in a range of about 14 millimeters to 16 millimeters for the optical fiber cable having 144 fibers.
5. In an embodiment of the present disclosure, the optical fiber cable may include a plurality of ripcords. The plurality of ripcords is positioned in the plurality of layers and extending along the longitudinal axis of the optical fiber cable. In addition, the plurality of ripcords is made of polyester based twisted yarns.
6. In an embodiment of the present disclosure, each of the plurality of strength members is made of fiber reinforced plastic. In addition, each of the plurality of strength members is coated with ethylene acrylic acid. Further, the two pairs of the strength members are positioned 180 degree apart.
7. In an embodiment of the present disclosure, the plurality of layers includes a second layer. The second layer is made of polyethylene material and a foaming master batch. In addition, the foaming master batch is a chemical foaming agent used to reduce weight of the second layer. Further, the foaming master batch is processed at a temperature of at least 220 degree centigrade.
8. In an embodiment of the present disclosure, the plurality of layers includes a second layer. The second layer has a thickness in a range of about 0.6 millimeter to 0.8 millimeter. In addition, the second layer has a diameter in a range of about 7.6 millimeters to 8.0 millimeters for the optical fiber cable having 144 fibers.
9. In an embodiment of the present disclosure, the plurality of layers includes a second layer. In addition, the second layer is having a weight in a range of about 8.86 to 20.43 kg when the second layer is made by using foaming agent master batch with the polyethylene material.
10. In an embodiment of the present disclosure, the optical fiber cable has a weight of about 106 kilogram±10% for the optical fiber cable having 144 fibers.

BRIEF DESCRIPTION OF THE FIGURES

Figure 1:
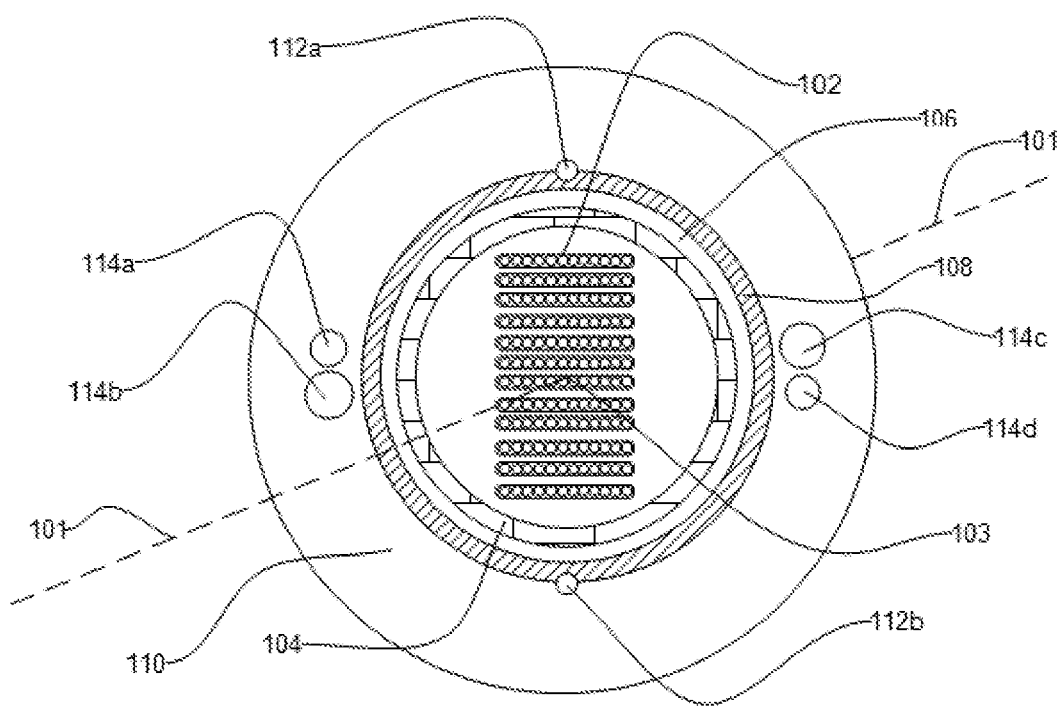
Figure 2:
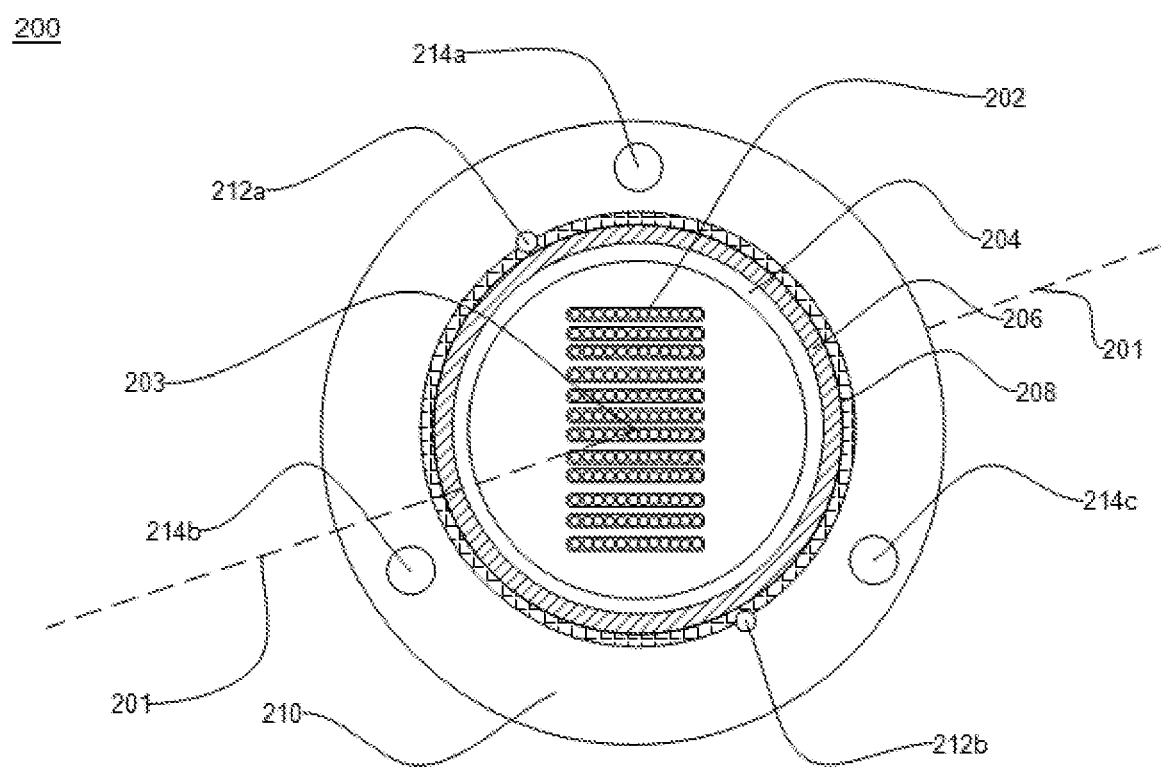

Having thus described the invention in general terms, reference will now be made to the accompanying drawings, which are not necessarily drawn to scale, and wherein:

FIG. 1 illustrates a cross sectional view of an optical fiber cable, in accordance with an embodiment of the present disclosure; and FIG. 2 illustrates a cross sectional view of the optical fiber cable, in accordance with another embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates a cross-sectional view of an optical fiber cable 100 for indoor and outdoor applications, in accordance with an embodiment of the present disclosure. In an embodiment of the present disclosure, the optical fiber cable 100 may be defined by an arrangement of a plurality of strength members. The cross sectional view describes a layered structure and distribution of discrete elements of the optical fiber cable 100. The layered structure of the optical fiber cable 100 includes a plurality of optical fibers 102 and a plurality of layers. The plurality of layers includes a first layer 104, a second layer 106, a third layer 108 and a fourth layer 110. In addition, the optical fiber cable 100 includes a plurality of ripcords 112a-112b and the plurality of strength members 114a-114d. Further, each layer of the plurality of layers is concentric to the other layers. The above combination of structural elements enables an improvement in a plurality of parameters of the optical fiber cable 100. The plurality of parameters includes a tensile strength, flexibility, a crush resistance, installation efficiency, and the like.

The optical fiber cable 100 includes a plurality of optical fibers 102 lying substantially along the longitudinal axis 101 of the optical fiber cable 100. The longitudinal axis passes through the center 103 of the optical fiber cable 100. In general, the plurality of optical fibers 102 are sandwiched, encapsulated, and/or edge bonded to form an optical-fiber ribbon. In general, each of the plurality of optical fibers 102, in the plurality of optical fibers ribbons is a fiber used for transmitting information as light pulses from one end of the optical fiber cable 100 to another end of the optical fiber cable 100. In addition, each of the plurality of optical fibers 102 is a thin strand of glass capable of transmitting optical signals. Also, each of the plurality of optical fibers 102 is configured to transmit large amounts of information over long distances with relatively low attenuation. Further, each of the plurality of optical fibers 102 includes a core region and a cladding region. The core region is an inner part of an optical fiber and the cladding section is an outer part of the optical fiber. Moreover, the core region is defined by a central longitudinal axis 101 of each of the plurality of optical fibers 102. In addition, the cladding region surrounds the core region.

In an embodiment of the present disclosure, the number of optical fibers in one ribbon is fixed. In another embodiment of the present disclosure, the number of optical fibers in one ribbon may vary. Further, the plurality of optical-fiber ribbons is aggregated to form a ribbon stack. The ribbon stack has various sizes and shapes. In an embodiment of the present disclosure, optical fiber ribbons are arranged to form a rectangular ribbon stack. In another embodiment of the present disclosure, the plurality optical fiber ribbons may arrange to form any different shape.

In an embodiment of the present disclosure, the plurality of optical fibers 102 in the plurality of optical fibers ribbons has a fiber attenuation of about 0.4 dB/km at a wavelength of about 1310 nanometers. In another embodiment of the present disclosure, the plurality of optical fibers 102 in the plurality of optical fibers ribbons has a fiber attenuation of about 0.40 dB/km at a wavelength of 1383 nanometers. In yet another embodiment of the present disclosure, the plurality of optical fibers 102 in the plurality of optical fibers ribbons has a fiber attenuation of about 0.30 dB/km at a wavelength of 1550 nanometers. The fiber attenuation corresponds to a loss in optical power as the light travels through the optical fiber. In an embodiment of the present disclosure, the plurality of optical fibers 102 in the plurality of optical fibers ribbons is single mode optical fibers. In another embodiment of the present disclosure, the plurality of optical fibers 102 in the plurality of optical fibers ribbons is multi-mode optical fibers.

In an embodiment of the present disclosure, the plurality of layers includes the first layer 104. The first layer 104 surrounds the plurality of optical fibers 102. In an embodiment of the present disclosure, the first layer 104 is a water swellable tape. The water swellable tape is used to prevent ingression of water and moisture inside the core of the optical fiber cable 100. In an embodiment of the present disclosure, the first layer 104 has a thickness in a range of about 0.10 millimeter to 0.20 millimeter. In another embodiment of the present disclosure, the thickness of the first layer 104 has any suitable thickness.

In an embodiment of the present disclosure, the plurality of layers includes the second layer 106. In an embodiment of the present disclosure, the second layer 106 is a buffer tube layer. The buffer tube lies substantially along the longitudinal axis 101 of the optical fiber cable 100. The second layer 106 surrounds the first layer 104. In addition, the second layer 106 provides mechanical isolation, physical damage protection to fibers. In an embodiment of the present disclosure, the second layer 106 is made of both a Polyethylene material and a foaming master batch. In general the master batch is a foaming agent. The master batches are used to reduce weight without affecting the performance of tube material. In addition, the foaming master batch optimizes cost in products. In an embodiment of present disclosure, the foaming master batch reduces the weight of the buffer tube by 5% to 6%. Further, the foaming master batch starts decomposing at about 160 degree centigrade. Furthermore, a temperature of at least 220 degree centigrade is required for the processing of the foaming master batch. The second layer 106 is having a weight in a range of about 8.86 to 20.43 kg when the second layer 106 is made by using foaming agent master batch with the polyethylene material. The second layer 106 is having a weight in a range of about 8.4 to 21.53 kg when the second layer 106 is made of polyethylene material without using any foaming agent master batch. Moreover, the weight of the second layer 106 is reduced to a range of about 0.41 to 1.1 kg after using the polyethylene material of the second layer 106 with the foaming master batch.

In another embodiment of the present disclosure, the second layer 106 is made of low smoke zero halogen (LSZH) material. In yet another embodiment of the present disclosure, the second layer 106 is made of any other suitable material. In an embodiment of the present disclosure, the second layer 106 has a diameter in a range of about 7.6 millimeters to 8.0 millimeters when the number of fibers present inside the optical fiber cable 100 is 144. In another embodiment of the present disclosure, the second layer 106 has the diameter in any suitable range. In an embodiment of the present disclosure, the second layer 106 has a thickness in a range of about 0.7 millimeter±0.1 millimeter.

The second layer 106 has a filling co-efficient of at least 0.3. In addition, the filling coefficient is defined by the ratio of area of plurality of fibers 102 to a first area of the buffer tube. The first area of the buffer tube represents the inner area of the buffer tube. Further, when the filing co-efficient of the second layer 106 decreases from 0.3, the optical fiber cable 100 fails water penetration test. Furthermore, the decrease in filling co-efficient of the second layer 106 affects the blowing performance of the optical fiber cable 100. Moreover, when the filling co-efficient of the second layer 106 is more than 0.4, the plurality of optical fibers 102 of the optical fiber cable 100 gets crushed which results in optical issues like breaking of fibers. In an embodiment of the present disclosure, the plurality of layers includes the third layer 108. The third layer 108 concentrically surrounds the second layer 106. In an embodiment of the present disclosure, the third layer 108 is a water swellable tape. The water swellable tape is used to prevent ingression of water and moisture inside the core of the optical fiber cable 100. In an embodiment of the present disclosure, the third layer 108 has a thickness in a range of about 0.2 millimeter to 0.3 millimeter. In another embodiment of the present disclosure, the third layer 108 has the thickness in any suitable range.

In an embodiment of the present disclosure, the plurality of layers includes the fourth layer 110. The fourth layer 110 concentrically surrounds the third layer 108. In an embodiment of the present disclosure, the fourth layer 110 is a sheath made of polyethylene material. In another embodiment of the present disclosure, the fourth layer 110 is made of any other suitable material. In an example, the other suitable material includes LSZH, High density polyethylene material (hereinafter "HDPE") and Medium density polyethylene material (hereinafter "MDPE"). The fourth layer 110 protects the optical fiber cable 100 from harsh environment and harmful UV rays. In addition, the fourth layer 110 has the inherent ability to resist crushes, kinks and tensile stress. In an embodiment of the present disclosure, the fourth layer 110 has a diameter in a range of about 14 millimeters to 16 millimeters when the number of fibers inside the optical fiber cable 100 is 144. In an embodiment of the present disclosure, the fourth layer 110 has a thickness in a range of about 2.5 millimeters to 3.5 millimeters. In another embodiment of the present disclosure, the fourth layer 110 has a suitable range of diameter and thickness.

The optical fiber cable 100 includes the plurality of ripcords 112a-112b. The plurality of ripcords 112a-112b lies substantially along the longitudinal axis 101 of the optical fiber cable 100. The plurality of ripcords 112a-112b facilitates easy access to the plurality of optical fibers 102. In an embodiment of the present disclosure, the number of ripcords present in the optical fiber cable 100 is 2. In another embodiment of the present disclosure, the number of ripcords in the optical fiber cable 100 may vary. In an embodiment of the present disclosure, the position of the plurality of ripcords 112a-112b is between the third layer 108 and the fourth layer 110. In another embodiment of the present disclosure, the plurality of ripcords 112a-112b is embedded in any one of the layers. In an embodiment of the present disclosure, the plurality of ripcords 112a-112b is positioned diametrically opposite to each other. In an embodiment of the present disclosure, the plurality of ripcords 112a-112b is made of polyester based twisted yarns. In another embodiment of the present disclosure, the plurality of ripcords 112a-112b is made of any other suitable material.

The optical fiber cable 100 includes a plurality of strength members 114a-114d. In an embodiment of the present disclosure, the plurality of strength members 114a-114d is embedded in exactly one layer of the plurality of layers. In an example, the plurality of strength members 114a-114d is embedded longitudinally in the fourth layer 110. In an embodiment of the present disclosure, each of the plurality of strength members 114a-114d is circular in cross section. In general, the plurality of strength members 114a-114d is embedded in the fourth layer 110 to achieve environmental and tensile requirements. In addition, the plurality of strength members 114a-114d are embedded inside the fourth layer 110 to restrict shrinkage of the optical fiber cable 100 during thermal cycling. Moreover, the plurality of strength members 114a-114d provides robustness and tensile strength to the optical fiber cable 100. In an embodiment of the present disclosure, each of the plurality of strength members 114a-114d is made of fiber reinforced plastic. In another embodiment of the present disclosure, each of the plurality of strength members 114a-114d is made of steel wire. In yet another embodiment of the present disclosure, each of the plurality of strength members 114a-114d is made of any other suitable material. In an embodiment of the present disclosure, each of the plurality of strength members 114a-114d is coated with ethylene acrylic acid to reduce slippage from the fourth layer 110. In an embodiment of the present disclosure, the number of strength member in the optical fiber cable 100 is 4. In another embodiment of the present disclosure, the number of strength members may vary.

In an embodiment of the present disclosure, the plurality of strength members 114a-114d includes two pairs of strength members. In addition, the two pairs of the strength members are positioned diagonally opposite to each other. The two pairs of strength members are positioned 180 degree apart. Further, each pair of strength members includes a first strength member 114a, 114d and a second strength member 114d, 114c. Furthermore, a first diameter of the first strength member 114a, 114d is in the range of about 1.4 millimeters to 1.6 millimeters. Also, a second diameter of the second strength member 114d, 114c is in the range of about 1.6 millimeters to 1.8 millimeters. The distance between the first strength member 114a, 114d and the second strength members 114b, 114c in each pair of strength members is in the range of about 0.1 millimeter to 0.4 millimeter. The first diameter is the inner diameter of the first strength member 114a, 114d and the second diameter is the inner diameter of the second strength member 114b, 114c. In an embodiment of the present disclosure, the range of the first diameter and the second diameter of the two pairs of strength members provides anti buckling strength to the optical fiber cable 100. In addition, the range of the first diameter and the second diameter of the two pairs of strength members provides optimum bending and flexibility to the optical fiber cable 100. Furthermore, the range of the first diameter and the second diameter of the two pairs of strength members facilitates in attaining tensile requirement of the optical fiber cable 100.

In addition, the increase in the first diameter and the second diameter of the two pairs of strength members result in increase in the plurality of parameters. In an example, the plurality of parameters includes thickness of the fourth layer 110, diameter of the optical fiber cable 100 and weight of the optical fiber cable 100. Further, the increase in the plurality of parameters affects the blowing performance of the optical fiber cable 100. Furthermore, the increase or decrease in the range of the first diameter and the second diameter of the two pairs of strength members affects the overall flexibility of the optical fiber cable 100.

In an embodiment of the present disclosure, the increase in the range of distance between the first strength member 114a, 114d and the second strength member 114b, 114c in each pair of strength members results in stiffness of the optical fiber cable 100. In addition, the stiffness of the optical fiber cable 100 makes the optical fiber cable 100 not feasible for flexible ducts. Further, the increase in the range of distance between the first strength member 114a, 114d and the second strength members 114b, 114c in each pair of strength members result in increase in bend radius. Furthermore, the increase in the range of distance between the first strength member 114a, 114d and the second strength members 114b, 114c in each pair of strength members creates Mid-span and stripping related issues. As, increase in distance between the first strength member and the second strength member makes the ripcords to come in place of strength members which affects stripping of the optical fiber cable 100. In an embodiment of the present disclosure, the size of the first strength member 114a, 114d is different from the size of the second strength member 114b, 114c. In addition, the first strength member 114a, 114d in each pair includes the strength member 114a and the strength member 114d having equal size. Further, the second strength member 114b, 114c in each pair includes the strength member 114b and the strength member 114c having equal size.

The optical fiber cable 100 is used for installation in ducts and micro ducts. The optical fiber cable 100 is used for indoor and outdoor applications. The optical fiber cable 100 is used without any grounding requirements. The optical fiber cable 100 is a ribbon type optical fiber cable. In general, ribbon cables have inherent advantage of mass fusion splicing. The mass fusion splicing makes the installation easy and saves a lot of time. Ribbon cables offer high packing density and higher fiber counts which enables more efficient use of limited duct space. The optical fiber cable 100 improves the blowing performance of the cable.

In an embodiment of the present disclosure, the optical fiber cable 100 has a short term tensile strength of about 2700 Newton and long term tensile strength of about 890 Newton. In an embodiment of the present disclosure, the minimum bending radius of the optical fiber cable 100 during installation is 20 D and during operation is 15 D. In an embodiment of the present disclosure, the crush resistance of the optical fiber cable is about 3000 Newton per 100 millimeter. In an embodiment of the present disclosure, the impact strength of the optical fiber cable is 25 Newton meter. In an embodiment of the present disclosure, the torsion of the optical fiber cable is ±180 degree. In an embodiment of the present disclosure, the temperature performance of the optical fiber cable 100 during installation is in the range of −30 degree Celsius to 70 degree Celsius. In an embodiment of the present disclosure, the temperature performance of the optical fiber cable 100 during operation is in the range of −40 degree Celsius to 70 degree Celsius. In an embodiment of the present disclosure, the temperature performance of the optical fiber cable 100 during storage is in the range of −40 degree Celsius to 70 degree Celsius. In another embodiment of the present disclosure, the optical fiber cable 100 has any suitable value or range of crush resistance, impact strength, torsion, tensile strength, minimum bending radius and temperature performance.

In an embodiment of the present disclosure, the optical fiber cable 100 includes a plurality of colored optical fibers. The color of each of the plurality of optical fibers 102 is selected from a group. The group includes blue, orange, green, brown, slate, white, red, black, yellow, violet, pink and aqua. The plurality of optical fibers 102 is present inside the buffer tube.

In an embodiment of the present disclosure, the total number of ribbons is 4. The fibers present per ribbon are 12. The total number of fibers in the buffer tube is 48 (12*4=48). The diameter of the optical fiber cable 100 corresponding to 48 fibers is about 12.5 millimeters. The weight of the optical fiber cable 100 corresponding to 48 fibers is 162±10% kilograms per kilometer.

In an embodiment of the present disclosure, the total number of ribbons is 8. The fibers present per ribbon are 12. The total number of fibers in the buffer tube is 96 (12*8=96). The diameter of the optical fiber cable 100 corresponding to 96 fibers is about 13.7 millimeters. The weight of the optical fiber cable 100 corresponding to 96 fibers is 190±10% kilograms per kilometer.

In an embodiment of the present disclosure, the total number of ribbons is 12. The fibers present per ribbon are 12. The total number of fibers in the buffer tube is 144 (12*12=144). The diameter of the optical fiber cable 100 corresponding to 144 fibers is about 14.7 millimeters. The weight of the optical fiber cable 100 corresponding to 144 fibers is 106±10% kilograms per kilometer.

In an embodiment of the present disclosure, the total number of ribbons is 12. The fibers present per ribbon are 24. The total number of fibers in the buffer tube is 288 (24*12=288). The diameter of the optical fiber cable 100 corresponding to 288 fibers is about 21.5 millimeters. The weight of the optical fiber cable 100 corresponding to 288 fibers is 425±10% kilograms per kilometer.

In an embodiment of the present disclosure, the total number of ribbons is 18. The fibers present per ribbon are 24. The total number of fibers in the buffer tube is 432 (24*18=432). The diameter of the optical fiber cable 100 corresponding to 432 fibers is about 23 millimeters. The weight of the optical fiber cable 100 corresponding to 432 fibers is 470±10% kilograms per kilometer.

In an embodiment of the present disclosure, the total number of ribbons is 28. The fibers present per ribbon are divided into two groups. The first group includes 24 fibers per ribbon. The second group includes 36 fibers per ribbon. The number of ribbons corresponding to first group is 12. The total number of fibers corresponding to first group is 288 (12*24=288). The number of ribbons corresponding to second group is 16. The total number of fibers corresponding to second group is 576 (16*36=576). The total number of fibers present inside the buffer tube is 864 (288+576=864). The diameter of the optical fiber cable 100 corresponding to 864 fibers is about 25.5 millimeters. The weight of the optical fiber cable 100 corresponding to 864 fibers is 540±10% kilograms per kilometer.

FIG. 2 illustrates a cross-sectional view of another optical fiber cable 200 for indoor and outdoor applications, in accordance with another embodiment of the present disclosure. The cross sectional view describes a layered structure and distribution of discrete elements of the optical fiber cable 200. The layered structure of the optical fiber cable 200 includes a plurality of optical fibers 202 a first layer 204, a second layer 206, a third layer 208 and a fourth layer 210.

In addition, the optical fiber cable 200 includes a plurality of ripcords 212a-212b and a plurality of strength members 214a-214c. The above combination of structural elements enables an improvement in a plurality of parameters of the optical fiber cable 200. The plurality of parameters includes tensile strength, flexibility, crush resistance, installation efficiency and the like.

The optical fiber cable 200 includes a plurality of optical fibers 202. The plurality of optical fibers 202 lies substantially along a longitudinal axis 201 of the optical fiber cable 200. The longitudinal axis 201 passes through the center 203 of the optical fiber cable 200. In general, the plurality of optical fibers 202 are sandwiched, encapsulated, and/or edge bonded to form an optical-fiber ribbon. In general, each of the plurality of optical fibers 202 in the plurality of optical fibers ribbons is a fiber used for transmitting information as light pulses from one end of the optical fiber cable 200 to another end of the optical fiber cable 200. In addition, each of the plurality of optical fibers 202 is a thin strand of glass capable of transmitting optical signals. Also, each of the plurality of optical fibers 202 is configured to transmit large amounts of information over long distances with relatively low attenuation. Further, each of the plurality of optical fibers 202 includes a core region and a cladding region. The core region is an inner part of an optical fiber and the cladding section is an outer part of the optical fiber. Moreover, the core region is defined by a central longitudinal axis 201 of each of the plurality of optical fibers 202. In addition, the cladding region surrounds the core region.

In an embodiment of the present disclosure, the number of optical fibers in one ribbon is fixed. In another embodiment of the present disclosure, the number of optical fibers in one ribbon may vary. Further, the plurality of optical-fiber ribbons is aggregated to form a ribbon stack. The ribbon stack has various sizes and shapes. In an embodiment of the present disclosure, optical fiber ribbons are arranged to form a rectangular ribbon stack. In another embodiment of the present disclosure, the plurality of optical fiber ribbons may arrange to form any different shape ribbon stack.

In an embodiment of the present disclosure, the plurality of optical fibers 202 in the plurality of optical fibers ribbons has a fiber attenuation of about 0.4 dB/km at a wavelength of about 1310 nanometers. In another embodiment of the present disclosure, the plurality of optical fibers 202 in the plurality of optical fibers ribbons has a fiber attenuation of about 0.40 dB/km at a wavelength of 1383 nanometers. In yet another embodiment of the present disclosure, the plurality of optical fibers 202 in the plurality of optical fibers ribbons has a fiber attenuation of about 0.30 dB/km at a wavelength of 1550 nanometers. The fiber attenuation corresponds to a loss in optical power as the light travels through the optical fiber. In an embodiment of the present disclosure, the plurality of optical fibers 202 in the plurality of optical fibers ribbons is single mode optical fibers. In another embodiment of the present disclosure, the plurality of optical fibers 202 in the plurality of optical fibers ribbons is multi-mode optical fibers.

The optical fiber cable 200 includes the first layer 204. The first layer 204 surrounds the plurality of optical fibers ribbons. In an embodiment of the present disclosure, the first layer 204 is a water swellable tape. The water swellable tape is used to prevent ingression of water and moisture inside the optical fiber cable 200. In an embodiment of the present disclosure, the first layer 204 has a thickness in a range of about 0.10 millimeter to 0.20 millimeter. In another embodiment of the present disclosure, the thickness of the first layer 204 may vary.

The optical fiber cable 200 includes the second layer 206. In an embodiment of the present disclosure, the second layer 206 is a buffer tube layer. The buffer tube layer lies substantially along the longitudinal axis 201 of the optical fiber cable 200. The second layer 206 surrounds the first layer 204. The second layer 206 provides mechanical isolation and physical damage protection to the plurality of optical fibers 202. In an embodiment of the present disclosure, the second layer 206 is made of Polyethylene material. In another embodiment of the present disclosure, the second layer 206 is made of low smoke zero halogen (LSZH) material. In yet another embodiment of the present disclosure, the second layer 206 is made of any other suitable material.

In an embodiment of the present disclosure, the second layer 206 is made of polyethylene material and master batch. In general the master batch is a foaming agent. The additive master batches are used to reduce weight without affecting the performance of tube material. In addition, the foaming master batch optimizes cost in products. In an embodiment of present disclosure, the foaming master batch reduces the weight of the buffer tubes by 5% to 6%. Further, the foaming master batch starts decomposing at about 160 degree centigrade. Furthermore, a temperature of at least 220 degree centigrade is required for the processing of the foaming master batch.

In an embodiment of the present disclosure, the second layer 206 has a diameter in a range of about 7.6 millimeters to 8.0 millimeters when the number of optical fibers inside the optical fiber cable 200 is 144. In another embodiment of the present disclosure, the second layer 206 has the diameter in any suitable range corresponding to different number of fibers in the optical fiber cable 200. In an embodiment of the present disclosure, the second layer 206 has a thickness in a range of about 0.7 millimeter±0.1 millimeter. In another embodiment of the present disclosure, the second layer 206 has the thickness in any suitable range.

The optical fiber cable 200 includes the third layer 208. The third layer 208 concentrically surrounds the second layer 206. In an embodiment of the present disclosure, the third layer 208 is a water swellable tape. The water swellable tape is used to prevent ingression of water and moisture inside the optical fiber cable 200. In an embodiment of the present disclosure, the third layer 208 has a thickness in a range of about 0.2 millimeter to 0.3 millimeter. In another embodiment of the present disclosure, the third layer 208 has the thickness in any suitable range.

In an embodiment of the present disclosure, the optical fiber cable 200 includes an armoring layer positioned in between the third layer 208 and the fourth layer 210. In another embodiment of the present disclosure, the optical fiber cable 200 does not include any armoring layer. In an embodiment of the present disclosure, the armoring layer is made of a corrugated ECCS steel tape. The corrugated ECCS tape is used to limit the signal attenuation during fire. In another embodiment of the present disclosure, the armoring layer is made of flat fiber reinforced plastic (FRP). In yet another embodiment of the present disclosure, the armoring layer is made of steel wire. In yet another embodiment of the present disclosure, the armoring layer is made of glass yarns. In yet another embodiment of the present disclosure, the armoring layer is made of Aramid yarns. In yet another embodiment of the present disclosure, the armoring layer is made of any other suitable material.

The optical fiber cable 200 includes the fourth layer 210. The fourth layer 210 concentrically surrounds the third layer 208. In an embodiment of the present disclosure, the fourth layer 210 is a sheath made of UV proof black polyethylene material. In another embodiment of the present disclosure, the fourth layer 210 is made of any other suitable material. In an example, the other suitable material includes LSZH, High density polyethylene material (hereinafter "HDPE") and Medium density polyethylene material ((hereinafter "MDPE")). The fourth layer 210 protects optical fiber cable 200 from harsh environment and harmful UV rays. In addition, the fourth layer 210 has the inherent ability to resist crushes, kinks and tensile stress. In an embodiment of the present disclosure, the fourth layer 210 has a diameter in a range of about 14 millimeters to 16 millimeters when the number of fibers present inside the optical fiber cable 200 is 144. In an embodiment of the present disclosure, the fourth layer 210 has a thickness in a range of about 2.5 millimeters to 3.5 millimeters. In another embodiment of the present disclosure, the fourth layer 210 may have any suitable range of diameter and thickness.

The optical fiber cable 200 includes the plurality of ripcords 212a-212b. The plurality of ripcords 212a-212b lies substantially along the longitudinal axis 201 of the optical fiber cable 200. The plurality of ripcords 212a-212b facilitates easy access to the plurality of optical fibers 202. In an embodiment of the present disclosure, the number of ripcords present in the optical fiber cable 200 is 2. In another embodiment of the present disclosure, the number of ripcords in the optical fiber cable 200 may vary. In an embodiment of the present disclosure, the position of the plurality of ripcords 212a-212b is between the third layer 208 and the fourth layer 210. In another embodiment of the present disclosure, the plurality of ripcords 212a-212b is embedded in any of the layers. In an embodiment of the present disclosure, the plurality of ripcords 212a-212b is positioned diametrically opposite to each other. In an embodiment of the present disclosure, the plurality of ripcords 212a-212b is made of polyester based twisted yarns. In another embodiment of the present disclosure, the plurality of ripcords 212a-212b is made of any other suitable material.

The optical fiber cable 200 includes a plurality of embedded strength members 214a-214c. The pluralities of embedded strength members 214a-214c are embedded longitudinally in the fourth layer 210 at 120 degree apart from each other. In an embodiment of the present disclosure, each of the plurality of strength members 214a-214c is circular in cross section In general, the plurality of embedded strength members 214a-214c are embedded in the fourth layer 210 to achieve environmental and tensile requirements. The pluralities of embedded strength members 214a-214c are embedded inside the fourth layer 210 to restrict shrinkage of optical fiber cable 200 during thermal cycling. Moreover, the plurality of embedded strength members 214a-214c provides robustness and tensile strength to the optical fiber cable 200. In an embodiment of the present disclosure, the plurality of embedded strength members 214a-214c is made of steel wire. In another embodiment of the present disclosure, the plurality of embedded strength members 214a-214c is made of any other suitable material. In an embodiment of the present disclosure, the number of embedded strength members in the optical fiber cable 200 is 3 and embedded inside the fourth layer 210 at 120 degree apart from each other to form a shape of triangle. In another embodiment of the present disclosure, the number of embedded strength members may vary and embedded at different positions in the fourth layer 210. In an embodiment of the present disclosure, each of the plurality of embedded strength members 214a-214c has a diameter in a range of about 1.4 millimeters to 1.8 millimeters. In another embodiment of the present disclosure, the diameter of each of the plurality of embedded strength members 214a-214c may vary. In an embodiment of the present disclosure, each of the plurality of embedded strength members 214a-214c is coated with ethylene acrylic acid to reduce slippage from the fourth layer.

In an embodiment of the present disclosure, the plurality of embedded strength members 214a-214c is embedded inside the fourth layer 210 at 120 degree apart from each other. Such position of the embedded strength members inside the fourth layer 210 is used to eliminate the preferential bending property of the optical fiber cable 200. In addition, the plurality of embedded strength members 214a-214c embedded inside the fourth layer 210 at 120 degree apart provides the flexibility to the optical fiber cable 200. An increase in the length of the first layer 204 results in micro and macro bends inside each of the plurality of optical fibers 202 in the plurality of optical fibers ribbons. The micro and the macro bends results in higher attenuation in the optical fiber cable 200. Accordingly, the plurality of embedded strength members 214a-214c embedded inside the fourth layer 210 at 120 degree apart act as anti-buckle or anti-shrink elements. In addition, the plurality of embedded strength members 214a-214c prevents the fourth layer 210 from shrinkage during thermal cycling and thus eliminates the preferential bending property of the optical fiber cable 200. In another embodiment of the present disclosure, any suitable number of embedded strength members is embedded inside the fourth layer 210 at some pre-defined degree. In an example, the pre-defined degree includes 90 degree, 180 degree, 45 degree, 30 degree, 60 degree and the like.

The optical fiber cable 200 is used for installation in ducts and micro ducts. The optical fiber cable 200 is used for indoor and outdoor applications. The optical fiber cable 200 is used without any grounding requirements. The optical fiber cable 200 is a ribbon type optical fiber cable. In general, ribbon cables have inherent advantage of mass fusion splicing. The mass fusion splicing makes the installation easy and saves a lot of time. Ribbon cables offer high packing density and higher fiber counts which enables more efficient use of limited duct space. The optical fiber cable 200 improves the blowing performance of the cable.

In an embodiment of the present disclosure, the optical fiber cable 200 has a short term tensile strength of about 2700 Newton (600 lbf) and long term tensile strength of about 890 Newton (200 lbf). In an embodiment of the present disclosure, the minimum bending radius of the optical fiber cable 200 during installation is 20 D and during operation is 15 D. In an embodiment of the present disclosure, the crush resistance of the optical fiber cable 200 is about 3000 Newton per 100 millimeter. In an embodiment of the present disclosure, the impact strength of the optical fiber cable 200 is 25 Newton meter. In an embodiment of the present disclosure, the torsion of the optical fiber cable 200 is ±180 degree. In an embodiment of the present disclosure, the temperature performance of the optical fiber cable 200 during installation is in the range of −30 degree Celsius to 70 degree Celsius. In an embodiment of the present disclosure, the temperature performance of the optical fiber cable 200 during operation is in the range of −40 degree Celsius to 70 degree Celsius. In an embodiment of the present disclosure, the temperature performance of the optical fiber cable 200 during storage is in the range of −40 degree Celsius to 70 degree Celsius. In another embodiment of the present disclosure, the optical fiber cable 200 has any suitable value or range of crush resistance, impact strength, torsion, tensile strength, minimum bending radius and temperature performance.

The optical fiber cable of the present disclosure offers a number of advantages over the conventional cables. Further, the optical fiber cable is a ribbon cable which has an inherent advantage of mass fusion splicing to make the installation easy and saves a lot of time. Moreover, the ribbon cables having dry buffer and dry core reduces preparation time due to absence of gel. Furthermore, the optical fiber cable eliminates the preferential bending property of the cable and thus provides flexibility to the cable for easy installation and blowing operations.

In an embodiment of the present disclosure, the optical fiber cable 200 includes a plurality of colored optical fibers. The color of each of the plurality of optical fibers 202 is selected from a group. The group includes blue, orange, green, brown, slate, white, red, black, yellow, violet, pink and aqua. The plurality of optical fibers 202 is present inside the buffer tube.

In an embodiment of the present disclosure, the total number of ribbons is 4. The fibers present per ribbon are 12. The total number of fibers in the buffer tube is 48 (12*4=48). The diameter of the optical fiber cable 200 corresponding to 48 fibers is about 12.5 millimeters. The weight of the optical fiber cable 200 corresponding to 48 fibers is 162±10% kilograms per kilometer.

In an embodiment of the present disclosure, the total number of ribbons is 8. The fibers present per ribbon are 12. The total number of fibers in the buffer tube is 96 (12*8=96). The diameter of the optical fiber cable 200 corresponding to 96 fibers is about 13.7 millimeters. The weight of the optical fiber cable 200 corresponding to 96 fibers is 190±10% kilograms per kilometer.

In an embodiment of the present disclosure, the total number of ribbons is 12. The fibers present per ribbon are 12. The total number of fibers in the buffer tube is 144 (12*12=144). The diameter of the optical fiber cable 200 corresponding to 144 fibers is about 14.7 millimeters. The weight of the optical fiber cable 200 corresponding to 144 fibers is 206±10% kilograms per kilometer.

In an embodiment of the present disclosure, the total number of ribbons is 12. The fibers present per ribbon are 24. The total number of fibers in the buffer tube is 288 (24*12=288). The diameter of the optical fiber cable 200 corresponding to 288 fibers is about 21.5 millimeters. The weight of the optical fiber cable 200 corresponding to 288 fibers is 425±10% kilograms per kilometer.

In an embodiment of the present disclosure, the total number of ribbons is 18. The fibers present per ribbon are 24. The total number of fibers in the buffer tube is 432 (24*18=432). The diameter of the optical fiber cable 200 corresponding to 432 fibers is about 23 millimeters. The weight of the optical fiber cable 200 corresponding to 432 fibers is 470±10% kilograms per kilometer.

In an embodiment of the present disclosure, the total number of ribbons is 28. The fibers present per ribbon are divided into two groups. The first group includes 24 fibers per ribbon. The second group includes 36 fibers per ribbon. The number of ribbons corresponding to first group is 12. The total number of fibers corresponding to first group is 288 (12*24=288). The number of ribbons corresponding to second group is 16. The total number of fibers corresponding to second group is 576 (16*36=576). The total number of fibers present inside the buffer tube is 864 (288+576=864). The diameter of the optical fiber cable 200 corresponding to 864 fibers is about 25.5 millimeters. The weight of the optical fiber cable 200 corresponding to 864 fibers is 540±10% kilograms per kilometer.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fiber cable comprising:
   a plurality of optical fibers lying substantially along a longitudinal axis of the optical fiber cable;
   a plurality of layers surrounding the plurality of optical fibers, wherein each layer of the plurality of layers is concentric to each other; and
   at least two pairs of strength members positioned diagonally to each other embedded in an outermost layer of the plurality of layers, wherein each of the at least two pairs of strength members include a first strength member and a second strength member;
   wherein the first strength member in one pair among the at least two pairs of strength members is equal in size with the first strength member in other pair among the at least two pairs of strength members and the second strength member in the one pair among the at least two pairs of strength members is equal in size with the second strength member in the other pair among the at least two pairs of strength members, and wherein the first strength member and the second strength member in each pair of the at least two pairs of strength members are unequal in size,
   wherein a distance between the first strength member and the second strength member in each pair of the at least two pairs of strength members is in a range of 0.1 millimeter to 0.4 millimeter.

2. The optical fiber cable as recited in claim 1, wherein a diameter of the first strength member is in a range of 1.4 millimeters to 1.6 millimeters.

3. The optical fiber cable as recited in claim 1, wherein the first strength member and the second strength member in each pair of the at least two pairs of strength members have different diameter.

4. The optical fiber cable as claimed in claim 1, further comprising a plurality of ripcords positioned in the plurality of layers and extending along the longitudinal axis of the optical fiber cable.

5. The optical fiber cable as claimed in claim 1, wherein the outermost layer has at least one of a thickness in a range of 2.5 millimeter to 3.5 millimeter, and a diameter in a range of 14 millimeters to 16 millimeter for the optical fiber cable having 144 fibers.

6. The optical fiber cable as claimed in claim 1, wherein the first strength member and the second strength member in each pair of the at least two pairs of strength members are made up one or more of fiber reinforced plastic and steel wire.

7. The optical fiber cable as claimed in claim 1, wherein an increase in the distance between the first strength member and the second strength member in each pair of the at least two pairs of strength members results in at least one of an increase in stiffness of the optical fiber cable and an increase in bend radius.

8. The optical fiber cable as recited in claim 1, wherein each pair of the at least two pairs strength members is coated with ethylene acrylic acid.

9. The optical fiber cable as recited in claim 1, wherein the plurality of optical fibers and a first layer of the plurality of layers is surrounded by a second layer of the plurality of layers, wherein the second layer is a buffer tube layer, wherein the second layer has a filling co-efficient of greater than 0.3 and wherein the filling co-efficient is a ratio of area of the plurality of optical fibers to a first area of the buffer tube.

10. The optical fiber cable as recited in claim 1, wherein a first layer and a second layer of the plurality of layers is surrounded by a third layer of the plurality of layers, wherein the third layer is a water blocking tape and wherein the third layer has a thickness in a range of 0.2 millimeter to 0.3 millimeter.

11. The optical fiber cable as recited in claim 1, wherein a diameter of the second strength member is in a range of 1.6 millimeters to 1.8 millimeters.

12. The optical fiber cable as claimed in claim 1, wherein a first layer of the plurality of layers is surrounded by a second layer of the plurality of layers, wherein the second layer is made of a polyethylene material and a foaming master batch, wherein the foaming master batch is a chemical foaming agent used to reduce weight of the second layer, wherein the foaming master batch is processed at a temperature of at least 220 degree centigrade.

13. The optical fiber cable as claimed in claim 1, wherein a first layer of the plurality of layers is surrounded by a second layer of the plurality of layers, wherein the second layer has at least one of a thickness in a range of 0.6 millimeter to 0.8 millimeter, and a diameter in a range of 7.6 millimeters to 8.0 millimeters for the optical fiber cable having 144 fibers.

14. The optical fiber cable as claimed in claim 1, wherein a first layer of the plurality of layers is surrounded by a second layer of the plurality of layers, wherein the second layer is having a weight in a range of 8.86 kilograms to 20.43 kilograms when the second layer is made by using foaming agent master batch with the polyethylene material.

* * * * *